M. H. HOFFMAN.
POPCORN POPPER.
APPLICATION FILED NOV. 30, 1908.

938,666.

Patented Nov. 2, 1909.

Witnesses
M. C. Lyddane
J. O. J. Mulhall

Inventor
Matthew H. Hoffman

By Joshua R. H. Potts
Attorney

UNITED STATES PATENT OFFICE.

MATTHEW H. HOFFMAN, OF CHICAGO, ILLINOIS, ASSIGNOR OF ONE-HALF TO ANTON SIMON, OF CHICAGO, ILLINOIS.

POPCORN-POPPER.

938,666.   Specification of Letters Patent.   Patented Nov. 2, 1909.

Application filed November 30, 1908. Serial No. 465,405.

*To all whom it may concern:*

Be it known that I, MATTHEW H. HOFFMAN, a citizen of the United States, residing at Chicago, in the county of Cook and State of Illinois, have invented certain new and useful Improvements in Popcorn-Poppers, of which the following is a specification.

My invention relates to an improved popcorn popper, the object of the invention being to provide improvements of this character with an improved stirrer or agitator rotated in the lower portion of the receptacle by my approved arrangement of gearing.

A further object is to provide an improved popper which will contain a large quantity of popcorn, and which can be readily manipulated to effectually pop the corn without danger of burning.

With these and other objects in view the invention consists in certain novel features of construction, and combinations, and arrangements of parts as will be more fully hereinafter described and pointed out in the claim.

Figure 1:
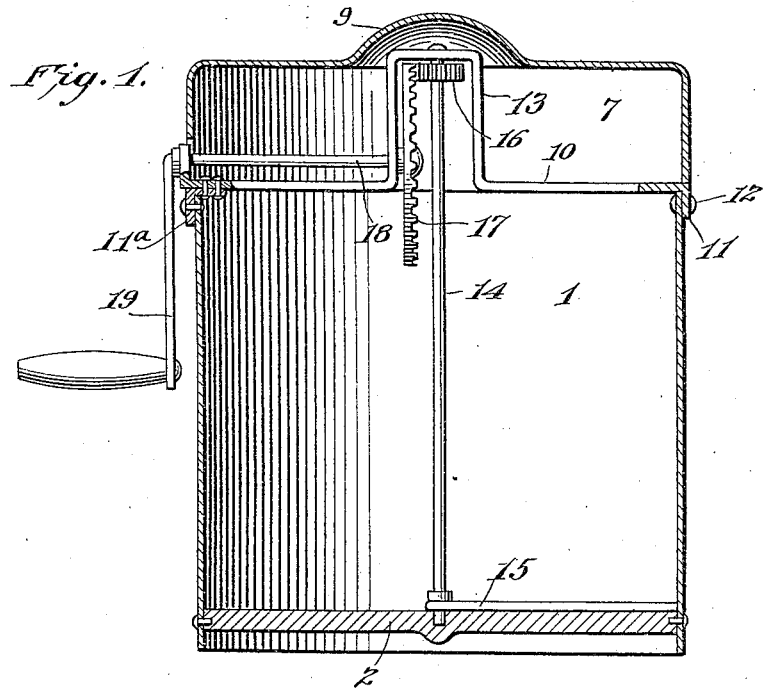
Figure 2:
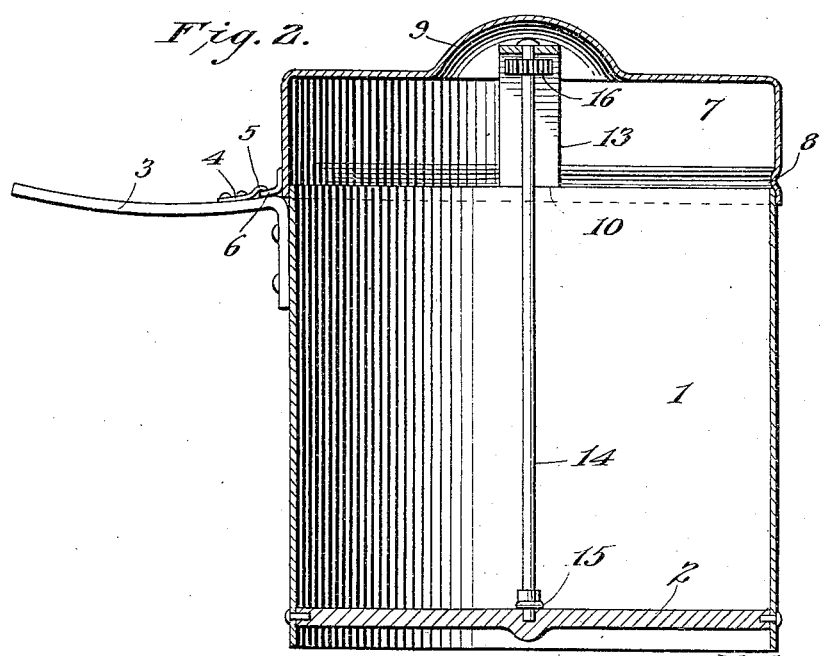

In the accompanying drawings, Figure 1, is a view in vertical section illustrating my improvements, and Fig. 2, is a view in vertical section taken at right angles to Fig. 1.

1 represents a cylindrical casing having a thick bottom 2 constituting a receptacle for the popcorn. A handle 3 of any desired length is secured to the casing 1, and is preferably composed of a single piece of metal bent at right angles as shown, and securely riveted to the casing 1 near its upper edge. This handle 3 has a bracket 4 secured thereon providing an eye or bearing 5 to receive a link 6 on the receptacle cover 7, and hinge the cover to the receptacle. The cover 7 is preferably made with an inwardly bent rib 8 to engage the upper edge of the receptacle or casing 1, and limit the downward movement of the casing, and the cover is made with a dome 9 to accommodate the internal frame work as will now be explained. A bar or frame 10 is bent at one end forming a lug 11 secured to the upper edge of casing 1 by means of rivets 12, and an angle bracket 11ª secures the other end of the bar 10 to casing 1. This bar or frame 10 between its ends, at the center of the receptacle, is made with an upwardly extending rectangular arch 13, and a shaft 14 has a bearing at its upper end in this arch and at its lower end has a thrust bearing in the center of the bottom 2. An arm or agitator 15 is secured on the shaft 14 near the bottom 2, and is adapted when the shaft is turned, to rotate in the casing and agitate the popcorn on the bottom of the receptacle, preventing any from lodging there and burning. A pinion 16 is fixed on the shaft 14, and is turned by a larger gear wheel 17 fixed to a horizontal shaft 18, the latter supported in bearings in the frame 10, and projecting beyond the casing, where it is provided with a suitable crank 19.

When the casing is supplied with the proper amount of popcorn, the cover 7 is dropped down and the casing located over a flame or other source of heat. As the corn begins to pop the operator turns crank 19 to revolve shaft 18, and gear wheel 17 to transmit motion to shaft 14 through the medium of pinion 16 and rotate the agitating arm 15 to prevent any of the popcorn sticking to the bottom and becoming burned.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In a device of the character described, the combination with a casing, of a frame secured to the upper end of said casing, said frame being formed of a single strip of metal bent to form a central arch, one end of said strip being bent downwardly and secured to the casing, and the other end bent upwardly, a bracket connecting the last said end to said casing, a vertical shaft located centrally in the casing having a bearing in said arch, and a thrust bearing in the casing bottom, an agitating arm secured on the shaft near the casing bottom, a pinion secured on the shaft within the arch, a horizontal shaft supported in bearings formed in said upturned end and said arch of the frame, a gear wheel on said horizontal shaft meshing with the pinion, and a crank on said horizontal shaft outside of the casing.

In testimony whereof I have signed my name to this specification in the presence of two subscribing witnesses.

MATTHEW H. HOFFMAN.

Witnesses:
JANET E. HOGAN,
HELEN F. LILLIS.